United States Patent
Repela et al.

(10) Patent No.: US 10,995,878 B2
(45) Date of Patent: May 4, 2021

(54) AIR CONTROL VALVE AND DEVICE FOR A CABIN SUSPENSION SYSTEM OF A MOTOR VEHICLE

(71) Applicant: WABCO Europe BVBA, Brussels (BE)

(72) Inventors: Marek Repela, Wroclaw (PL); Przemyslaw Zak, Wroclaw (PL)

(73) Assignee: WABCO Europe BVBA, Brussels (BE)

(*) Notice: Subject to any disclaimer, the term of this patent is extended or adjusted under 35 U.S.C. 154(b) by 0 days.

(21) Appl. No.: 16/438,942

(22) Filed: Jun. 12, 2019

(65) Prior Publication Data
US 2019/0383424 A1 Dec. 19, 2019

(30) Foreign Application Priority Data
Jun. 15, 2018 (EP) .................................. 18177996

(51) Int. Cl.
| | |
|---|---|
| F16K 47/08 | (2006.01) |
| B60G 17/052 | (2006.01) |
| F16K 15/02 | (2006.01) |
| F16K 15/06 | (2006.01) |
| B60G 17/056 | (2006.01) |
| F16K 47/02 | (2006.01) |

(52) U.S. Cl.
CPC .......... *F16K 47/08* (2013.01); *B60G 17/0523* (2013.01); *F16K 15/026* (2013.01); *B60G 2204/162* (2013.01); *B60G 2500/11* (2013.01); *B60G 2500/2044* (2013.01)

(58) Field of Classification Search
CPC ........ F16K 47/08; F16K 47/02; F16K 15/026; F16K 15/063; F16K 15/028; B60G 17/0523; B60G 17/056; B60G 2204/162; B60G 2500/11; B60G 2500/2044
USPC ........................................................ 137/514
See application file for complete search history.

(56) References Cited

U.S. PATENT DOCUMENTS

| | | | |
|---|---|---|---|
| 2,956,584 A | 10/1960 | Anderson et al. | |
| 3,889,935 A * | 6/1975 | Palm .................... | B60G 17/056 267/64.16 |
| 4,763,882 A * | 8/1988 | Nishiyama ........... | B60G 15/068 267/152 |
| 4,886,256 A * | 12/1989 | Nishiyama ............. | B60G 11/52 267/221 |

(Continued)

FOREIGN PATENT DOCUMENTS
WO 8203259 A1 9/1982

*Primary Examiner* — Jessica Cahill
*Assistant Examiner* — Patrick C Williams
(74) *Attorney, Agent, or Firm* — Dickinson Wright PLLC

(57) ABSTRACT

An air control valve (100) adapted to control an air flow (FA) for an air cushioning receptacle (802) in a motor vehicle (1000) includes a valve seat (120), a valve body (110), and a valve passage element (105) with a passage inlet (140) on an inlet side (141) and a passage outlet (150) on an outlet side (151). A coil spring (160) in contact with the valve body (110) and with a valve stop (152) on the outlet side (151) is adapted to exert a closing force (FC) to press the valve body (110) to the valve seat (120). A damping body (200) is arranged in an inner spring space (161) of the coil spring (160) such that the damping body (200) radially extends in a winding space (162) between a first coil winding (163) and a second coil winding (164) of the coil spring (160).

15 Claims, 4 Drawing Sheets

Fig. 1

(56) References Cited

U.S. PATENT DOCUMENTS

| | | | |
|---|---|---|---|
| 2005/0218572 A1* | 10/2005 | Soga | F16F 1/13 |
| | | | 267/166 |
| 2013/0313451 A1* | 11/2013 | Young | F16K 31/1262 |
| | | | 251/61.4 |
| 2014/0322061 A1* | 10/2014 | Moetakef | F04C 25/02 |
| | | | 418/241 |
| 2016/0114645 A1 | 4/2016 | Kim | |
| 2017/0074135 A1 | 3/2017 | Abram | |

\* cited by examiner

AIR CONTROL VALVE AND DEVICE FOR A CABIN SUSPENSION SYSTEM OF A MOTOR VEHICLE

TECHNICAL FIELD

The present disclosure relates to an air control valve and further to a respective air control valve device and cabin suspension system and motor vehicle.

BACKGROUND

Such an air control valve can be adapted to control an air flow for an air cushioning receptacle in a motor vehicle, wherein the air control valve comprises: a valve seat, a valve body, and a valve passage element with a passage inlet on an inlet side and a passage outlet on an outlet side, wherein a coil spring is in contact with the valve body and a valve stop on the outlet side, adapted to exert a closing force to press the valve body to the valve seat.

An air control valve for controlling an air flow, in particular for a cabin suspension system of a motor vehicle, is generally known. Through controlling an air flow into a bellows or out of the bellows, the suspension height of a vehicle or other components such as a trailer or a cabin of a vehicle, can be automatically controlled, in particular to a definable level.

In order to accommodate comfort and safety aspects, it is generally desirable to achieve a short reaction time when controlling the level of a vehicle or vehicle component. A short reaction time results in the requirement of directing a relatively large amount of air through the air control valve in a relatively small amount of time.

In order to fulfil the requirement, the valve diameter can be increased, which however also increases the force necessary to actuate the valve.

When an air flow, in particular the large air flow, passes through an air control valve, noise is generated. Such noise can be audible to a driver or a passenger or a person near the vehicle.

SUMMARY

It is therefore desirable to address at least one of the above problems.

In particular, it is desirable for an air control valve that the level of noise is reduced, which is generated by the air control valve during an air flow passing the air control valve, in particular to a non-audible level.

The present disclosure relates to an air control valve for controlling an air flow with an air spring and/or leveling device, in particular for a cabin suspension system of a motor vehicle, comprising a valve seat, a valve body, and a valve passage element with a passage inlet on an inlet side and a passage outlet on an outlet side, wherein a coil spring contacts the valve body and a valve stop on the outlet side, pressing the valve body against the valve seat with a closing force.

According to the present disclosure, a damping body is arranged in an inner spring space of the coil spring such that the damping body radially extends in a winding space between a first coil winding and a second coil winding of the coil spring.

The present disclosure is based on the finding that a major source of noise is the air flow passing the valve components, in particular when passing the coil spring. Such noise can be a screeching noise and can particularly occur when an exhaust air flow passes the air control valve. A typical exhaust pressure is 8 bar. When air with such exhaust pressure is released to atmospheric pressure, relatively high flow rates, in particular an exhaust air flow rate of at least 55 Liter/min, can occur in the air control valve.

The present disclosure has specifically recognized that when the air flow passes the coil spring, it exerts a varying force on single coil windings of the coil spring, exciting a movement of one or more coil windings, in particular an axial movement, that is a movement along the spring axis. Such movement can be of oscillating nature, in particular with an amplitude in axial direction, and may vary for different coil windings of a coil spring in frequency and amplitude. If the exciting force of the air stream exceeds a certain level, the amplitude of the movement of one or more coil windings can become so large that a first coil winding contacts a second, neighboring coil winding. A result of such contact of one or more coil windings is the generation of noise, in particular a screeching noise.

Based on this it was further recognized that by arranging a damping body in the inner spring space of the coil spring, such that the damping body radially extends in a winding space between a first coil winding and a second coil winding of the coil spring, the direct contact of two neighboring coil windings of the coil spring, in particular the direct contact between any neighboring coil windings of the coil spring, can be reduced or inhibited. Thus, the generation of noise can be reduced or completely inhibited.

An air spring with a damping body according to the concept of the present disclosure constitutes a surprisingly simple constructive measure to improve the noise characteristics of an air control valve. Through inserting a damping body into the inner spring space during assembly, the improved noise characteristics can be achieved.

Further developments of the present disclosure can be found in the dependent claims and show particular advantageous possibilities to realize above described concept in light of the object of the present disclosure and regarding further advantages.

The air control valve can be characterized in that the damping body radially extends in all winding spaces between the coil windings of the coil spring. By extending between all winding spaces between the coil windings of the coil spring, any contact between any neighboring coil windings of the coil spring can be fully suppressed, thus advantageously further improving the noise characteristics of the air control valve.

The air control valve can be characterized in that the damping body is adapted to prevent a contact between a first coil winding and a second coil winding when the coil spring is contracted, in particular when the air flow is an exhaust air flow. By preventing a contact of coil windings when the coil spring is contracted, a generation of noise is particularly inhibited when the air control valve is in an open condition, namely when the valve body is lifted from the valve seat. This particularly occurs when an exhaust air flow is passing through the air control valve. In such case, one or more coil windings normally would be excited by the passing air flow. With a damping body that is adapted to prevent a contact of coil windings when the coil spring is contracted—although one or more coil windings could theoretically still be able to move—it is advantageously prevented that coil windings directly hit each other, since the damping body extends between two or more, in particular any two, neighboring coil windings. In any development, the damping body can be further adapted to inhibit the movement of coil windings, at least to an extent where an excitation of coil movement by the passing air flow is inhibited.

The air control valve can be characterized in that the damping body is adapted to prevent a noise of a coil winding when the coil spring is contracted, in particular when the air flow is an exhaust flow. This can particularly imply, that the damping body is adapted to reduce or inhibit any movement of one or more coil windings of the coil spring due to an excitation caused by the air flow passing the one or more coil windings. The damping body can reduce or inhibited the movement of one or more coil windings by a frictional force between the damping body and the one or more coil windings. Such frictional force can particularly be achieved by a radial press fit between the coil spring and the damping body. One measure to achieve the radial press fit is by choosing a damping body with an outer diameter, which is larger compared to the diameter of an inner spring space of the coil spring. It is particularly advantageous when the damping body is comprised of elastic material.

The air control valve can be characterized in that the damping body is fitted into the coil spring with a press fit, in particular a radial press fit and/or an axial press fit. Through a press fit, the damping body can be reliably held in position, in particular within the inner spring space of the coil spring. With a radial press fit, a frictional force between one or more coil windings of the coil spring and the damping body can be achieved, reducing or inhibiting an axial movement of the one or more coil windings caused by the passing air flow. Also, a radial press fit leads to the expansion of the damping body in a radial direction, in particular through one or more spaces between two or more coil windings of the coil spring. By expanding through the one or more spaces, the damping body can create one or more damping beads, reducing or completely inhibiting a direct contact between set two or more coil windings of the coil spring. It is particularly advantageous if the radial press fit is achieved with a diameter ratio of between 1. and 4, more preferably between 1.1 and 2, most preferably 1.15, wherein the diameter ratio is the uncompressed damping body diameter divided by the inner spring diameter. For example, the uncompressed damping body diameter can be 6 mm, and the inner spring diameter can be 5.2 mm. The larger the uncompressed damping body diameter, the greater the compression and thus, the frictional force when in inserted into the coil spring. However, the greater the compression of the damping body is, the less air flow will be able to flow through the damping body.

With an axial press fit, the damping body can further be compressed, particularly leading to a radial expansion. Such radial expansion of the damping body further increases the frictional force between the coil spring and the damping body and also the creation of the damping beads. It is particularly advantageous if the axial press fit is achieved with a length ratio of between 2 and 10, more preferably between 4 and 6, most preferably 5, wherein the length ratio is the uncompressed damping body length divided by the compressed damping body length. For example, the uncompressed damping body length can be 15 mm, and the compressed damping body length can be 3 mm. Further possible values for the damping body length include 6 mm, 8 mm, 10 mm, 12 mm and 15 mm.

The air control valve can be characterized in that the damping body is separate from valve body and contacts a head side of valve body and also contacts the valve stop. As a separate component, the damping body can be manufactured separately and also replaced separately in case the damping body is defect or worn out, in particular without having to replace the complete valve assembly. Through being adapted to contact the head side of the valve body as well as the valve stop, the damping body can advantageously engage in an axial press fit when assembled. By contacting the valve body, the damping body can fulfil its damping function of the coils in an axial region of the coil spring where the air flow is particularly concentrated in the radial area of the coil spring, namely where the air flow flows around the valve body and enters the coil space.

The air control valve can be characterized in that the valve body consists of rubber. By choosing rubber as a valve body material, a good compromise is achieved in terms of weight of the valve body, stability and also sealing properties for selectively restricting an air flow between the valve body and the valve seat.

The air control valve can be characterized in that the damping body is elastic and/or form variable. A form variable damping body allows for the creation of the damping beads when inserted into the inner spring space of the coil spring and further can accommodate the compression movement of the coil spring.

Through an elastic damping body, the damping body can advantageously exert a frictional force on one or more coil windings of the coil spring when inserted with a press fit, in particular a radial press fit, into the inner spring space of the coil spring.

The air control valve can be characterized in that the damping body is air permeable, in particular an open cell body and/or a foam body, in particular a polyurethane body. An air permeable damping body can improve the air flow in the coil space of the valve passage element and in particular allows the air flow to pass the inner coil space when the damping element is inserted. A polyurethane body features advantageous characteristics for fulfilling the damping function according to the concept of the present disclosure and is further resistant to humidity, which might occur in the air flow.

The air control valve can be characterized in that the air control valve comprises an outer housing. Such outer housing can be an outer housing exclusively for the air control valve, forming an air control valve module. The outer housing can also be a part of a different, in particular superordinate module, such as a unit or a casing of a cabin suspension system.

The air control valve can be characterized in that the valve passage element has a throttling portion, wherein The throttling portion is arranged—in terms of the air flow—upstream of the valve seat and The throttling portion features an inner throttle diameter which is smaller than an inner valve diameter and the throttling portion has an outer throttle diameter which is smaller than an outer valve diameter. The throttling portion enables a throttling of the air flow, in particular an exhaust air flow, for example for regenerating an air dryer as part of the cabin suspension system or any other pressurized air system. By using the space radially outside the throttling portion for accommodating the lip seal, the valve passage element is of a compact design. That is because the space that is made available anyway by the decreased diameter of the throttling portion is used for the lip seal.

The air control valve can further comprise a lip seal arranged on an outer surface of the throttling portion. The lip seal enables to establish defined flow characteristics of the air control valve, for example enabling an air flow in one direction and inhibiting an air flow in the opposite direction. For example, the lip seal can be adapted to enable an air flow from the outlet side to the inlet side, but not the other way around. This way, any air flow from the inlet side to the outlet side is directed through the valve passage element.

The present disclosure also leads to an air control valve device comprising an air control valve, characterized in that the air cushioning receptacle is part of an air spring device and/or air leveling device, preferably for a cabin suspension system of the motor vehicle. The air control valve device also benefits from the advantages of the air control valve.

The present disclosure also leads to a vehicle cabin suspension system comprising an air control valve. The vehicle cabin suspension system also benefits from the advantages of the air control valve. The present disclosure also leads to a motor vehicle with cabin and cabin suspension system. The motor vehicle also benefits from the advantages of the air control valve.

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects.

BRIEF DESCRIPTION OF THE DRAWINGS

These and other aspects, features and technical effect will be apparent from and elucidated with reference to the drawings described hereinafter, in which.

DETAILED DESCRIPTION OF THE DRAWINGS

Figure 1:
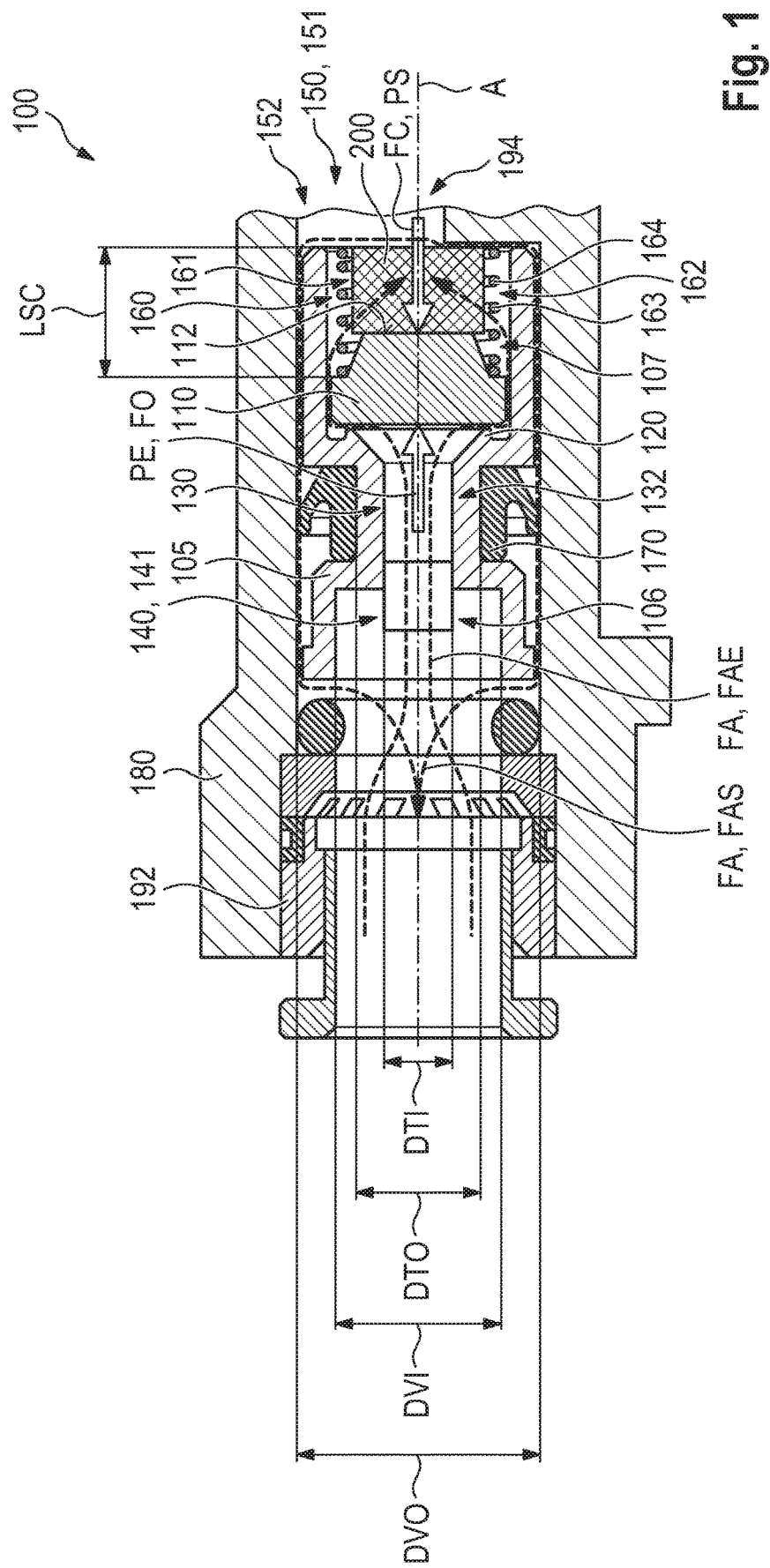
FIG. 1 shows an air control valve according to an embodiment of the present disclosure.

FIG. 1 shows an air control valve 100 according to the concept of the present disclosure. The air control valve 100 comprises a valve passage element 105, housed inside an outer housing 180. The air control valve 100 is adapted to control an air flow FA passing from an inlet side 141 through the valve passage element 105 to an outlet side 151, or vice versa. The air control valve 100 can be applied for controlling the pressure of an air bellows of an air suspension system for a vehicle.

The valve passage element 105 is rotationally symmetric around a valve axis A, such that it fits within a tubular-shaped, pipe-like the passage of the outer housing connecting a system connection socket 192 with a system exhaust line 194. The valve passage element 105 can be inserted into the valve passage 190 against a valve stop 152, which limits the axial movability of the valve passage element 105 on the outlet side 151. On the opposing inlet side 141, a system connection plug 196 can be inserted in order to limit the axial movability of the valve passage element 105 on the inlet side 141, and thus fix the valve passage element 105 inside the outer housing 180.

The valve passage element 105 has a tailored shape, in particular it features a throttling portion 130 in its axial middle section, that is between a connection space 106 and a coil space 107 of the valve passage element 105. An inner throttle diameter DTI of the throttling portion 130 is smaller than an inner valve diameter DVI of the valve passage element 105, in particular of the connection space 106. Also an outer throttle diameter DTO is smaller than an outer valve diameter DVO.

Behind the throttling portion 130—wherein "behind" relates to the direction of an exhaust air flow FAE—the valve passage element 105 comprises a valve seat 120. The valve seat 120 is a circular web that protrudes in an axial direction, that is along a valve axis A. The valve seat 120 is adapted to create a closed circular contact line with an axially movable valve body 110, wherein during such contact of the valve seat 120 with the valve body 110, the air flow FA is interrupted. In other words, when the valve body 110 is in full contact with the valve seat 120, the air control valve 100 is closed. The valve body 110 can have a diameter of 7 mm.

The valve body 110 is pressed against the valve seat 120 by a coil spring 160. The coil spring is located within the coil space 107 of the valve passage element 105 between the valve body 110 and the valve stop 152.

Compared to an uncompressed state in which the coil spring 160 features an uncompressed spring length LSU (not shown here), the coil spring 160 in its assembled state is compressed between the valve stop 152 and the valve body 110 (which is pressed against the coil spring 160 by the valve seat 120), so that the coil spring 160 features a compressed spring length LSC. Through being compressed to a compressed spring length LSC, the coil spring 160 exerts a closing force FC on the valve body 110, forcing the valve body 110 onto the valve seat 120.

During operation, an air flow FA, in particular an exhaust air flow FAE, passes through the valve passage element 105 and flows against the valve body 110, which is forced against the valve seat 120, thus restricting the passing of the air flow AF. Consequently, an exhaust pressure PE builds up inside the throttling portion 130, resulting in an opening force FO effecting on the valve body 110. Once the exhaust pressure PE is so high that the opening force FO exceeds the closing force FC, the valve body 110 will lift from the valve seat 120 and the coil spring 160 will further retract. Consequently, the air flow FA can pass the valve body. Thus, the air control valve 100 is in an open position. In such exhaust mode of the air control valve 100, the exhaust air flow FAE flows from the system connection socket 192 through the throttling portion 130 and along the valve body 110 to the system exhaust line 194. The coil spring 160 is adapted to restrict the exhaust air flow FAE once an exhaust pressure PE is below a certain value, e. g. 0.6 bar. This way, it is ensured that a certain residual pressure is always kept in the bellows in order to prevent damage to them.

In a supply mode of the air control valve 100, the air flow FA flows in the opposite direction of the exhaust air flow FAE, namely in a supply air flow FAS. Such supply air flow FAS leads to a significantly higher supply pressure PS, e. g. 7 to 8 bar, which results in a relatively high closing force FC and thus, a closing of the valve body 110. Consequently, the supply air flow FAS will not flow through the inner space of the valve passage element 105, but on its outside, between the valve passage element 105 and the outer housing 180.

In the axial portion of the smaller outer throttle diameter DTO, a lip seal 170 can be arranged, allowing for a unidirectional passing of the air flow AF in the passage between the valve passage element 105 and the outer housing 180. In particular, in the present embodiment, the lip seal 170 allows for an air flow AF in the direction of the supply air flow FAS but inhibits an air flow AF in the direction of the exhaust air flow FAE.

When the air control valve 100 is in an open position, the air flow FA will flow along the valve body 110 and further through the coil space 107 to the system exhaust line 194. In such case, the air flow FA can flow against one or more coil windings 163, 164 of the coil spring 160, since the coil spring 160 is located within the coil space 107, and can excite a movement, in particular an oscillating movement, of the one or more coil windings 163, 164. Such movement can result in the generation of a noise, in particular a screeching noise audible to a driver or a passenger or any other person in proximity of a vehicle.

According to the concept of the present disclosure, a damping body 200 is located within the coil space 107 and in particular within in inner spring space 161 of the coil spring 160.

Figure 2:
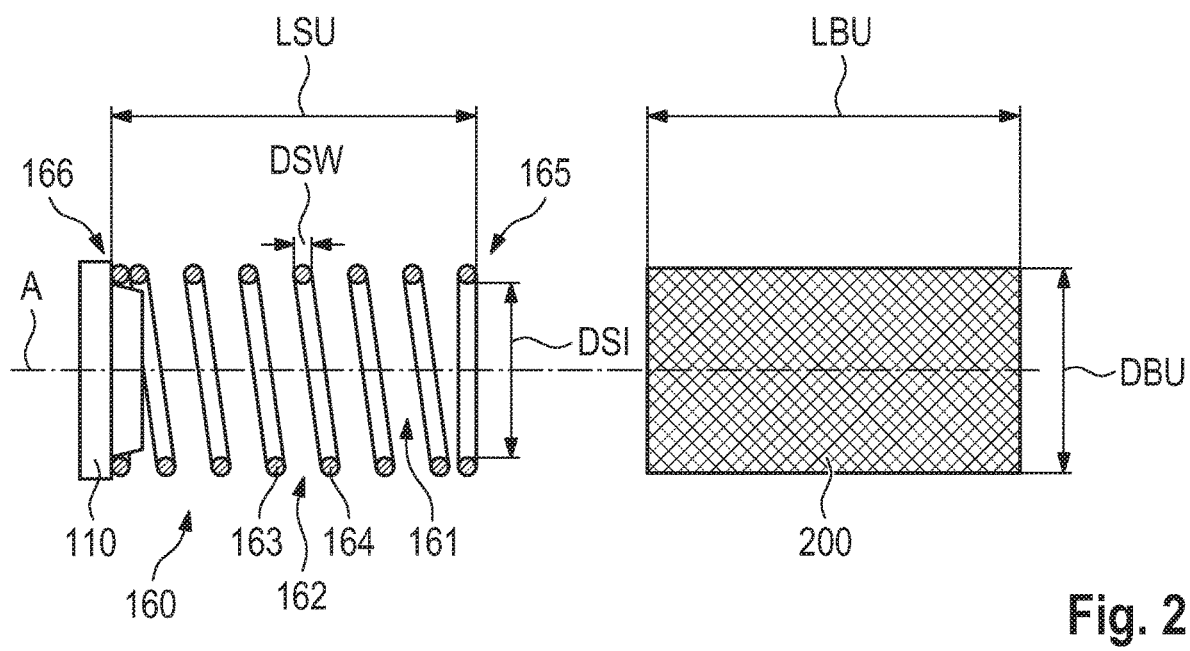
FIG. 2 shows a detail view of the air control valve of FIG. 1, with a valve head, a coil spring and a damping body in an unassembled state.
Figure 3:
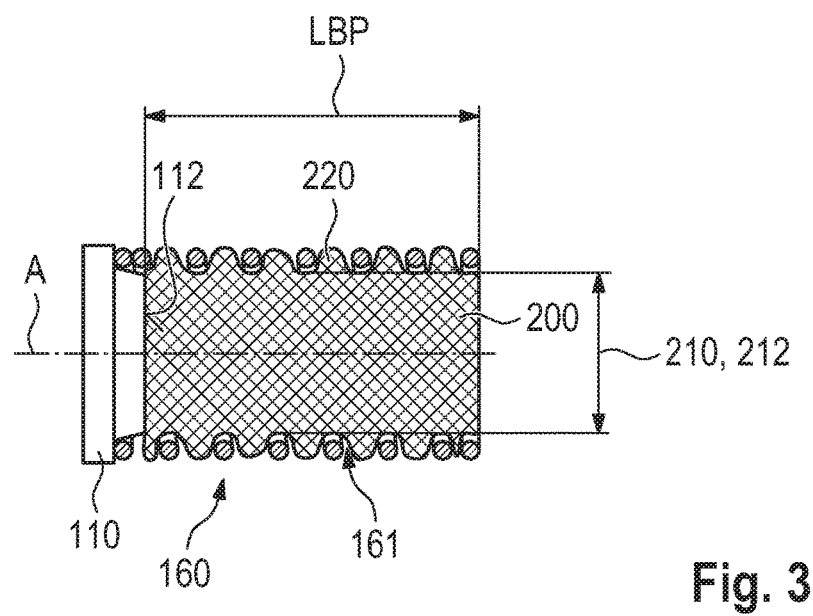
FIG. 3 shows the arrangement of FIG. 2 in a preassembled state.
Figure 4:
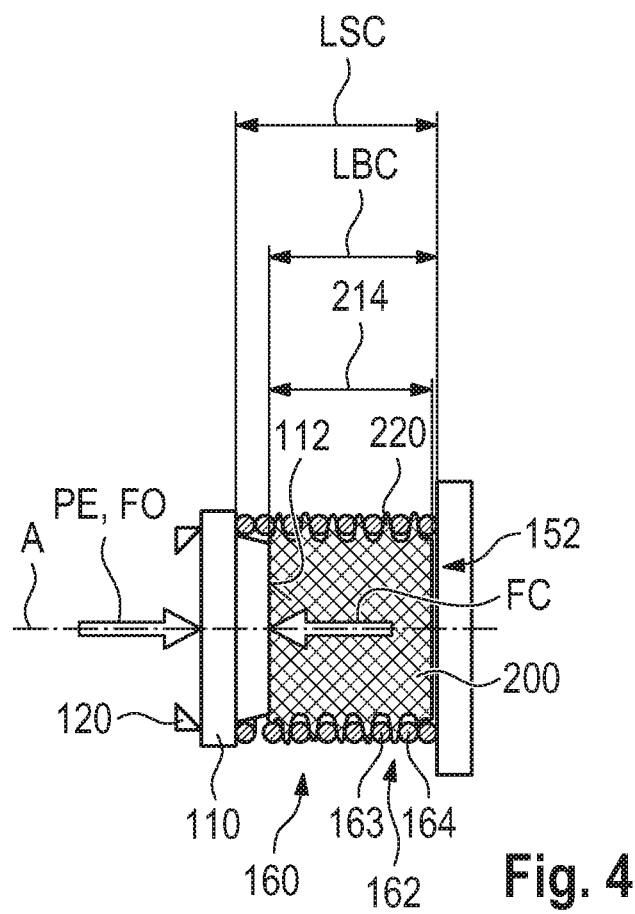
FIG. 4 shows the arrangement of FIG. 2 in an assembled and compressed state.

The damping body 200 is further shown in FIGS. 2 to 4. FIG. 2 shows a valve body 110, a coil spring 160 and a damping body 200 in an unassembled condition. The coil spring 160 is shown in a cross-sectional view with a cross-section plane along a valve axis A. The coil spring 160 has a known, spiral shape, wherein the coil spring 160 protrudes from a stop end 165 to a body end 166 in a helical manner, forming neighboring coils. In FIG. 2, a first coil 163 and a neighboring second coil 164 are shown as an example. One coil winding is considered one helical portion of the coil spring 160 along an angular interval of 360° around the valve axis A. Two neighboring coil windings 163, 164 are spaced apart by a winding space 162. In particular, all winding spaces 162 between a first coil winding 163 and a second coil winding 164 are equal, leading to the same axial distance (in a direction parallel to the valve axis A) between any two coil windings 163, 164 of the coil spring 160.

The coil spring 160 has a nearly cylindrical inner spring space 161, with an inner spring diameter DSI. The valve body 110 is fixed to the coil spring 160 at its body end 166. The coil spring 160 is shown in its uncompressed condition, featuring an uncompressed spring length LSU. For example, the uncompressed spring length LSU can be 12.5 mm. A coil spring's winding material diameter can be DSW=0.4 mm. Generally a range of LSU can comprise values between 8 to 16 mm and a range of DSW can comprise values between 0.1 to 0.7 mm.

Further in FIG. 2, the damping body 200 is shown. The damping body 200 is shown in its unassembled and uncompressed condition, featuring an uncompressed damping body diameter DBU, and an uncompressed damping body length LBU.

For example, the uncompressed damping body diameter DBU can be 6 mm, and the inner spring diameter can DSI be 5.2 mm resulting in a diameter ratio of approximately 1.15. Further possible damping body dimensions are:
DBU=8 mm and LBU=6 mm;
DBU=8 mm and LBU=8 mm;
DBU=8 mm and LBU=10 mm;
DBU=8 mm and LBU=15 mm;
DBU=6 mm and LBU=12 mm;
DBU=6 mm and LBU=15 mm.

In FIG. 3, the parts shown in FIG. 2 are also shown, however in a preassembled condition. In such preassembled condition, the damping body 200 is inserted into the inner spring space 161 of the coil spring 160. Since the inner spring diameter DSI of the coil spring 160 is smaller than the uncompressed damping body diameter DBU, the damping body 200 after insertion into the coil spring 160 is held within the inner spring space 161 by a press fit 210, in particular a radial press fit 212.

The damping body 200 is comprised of an elastic material and in particular is a foam body 202. Through inserting the damping body 200 into an inner spring space 161 of smaller volume, the damping body 200 will be radially compressed and at least in a frictional contact with the coil windings 163, 164 of the coil spring 160. Through such frictional contact, a movement, in particular an oscillating movement, of one or more coil windings 163, 164 that would be excited by an air flow, can be reduced or even completely inhibited. Furthermore, in some embodiments, the damping body 200 can form one or more damping beads 220 that protrude through one or more spaces 162 in between the coil windings 163, 164, as shown in FIG. 3. Such damping beads 220 extend radially through one or more winding spaces 162, therefore preventing a direct contact between a first coil winding 163 and a second coil winding 164, in particular in the case the coil windings 163, 164 are excited to any kind of movement. The damping body 200 is in contact with the head side 212 of the valve body 110. In this preassembled condition, the damping body 200 extends from the head side 112 to the stop end 165 of the coil spring 160 resulting in a precompressed damping body length LBP. The precompressed damping body length LBP is smaller than the uncompressed damping body length LBU, wherein the precompression is mainly caused by the frictional force between one or more coil windings 163, 164 of the coil spring 160 and the damping body 200 which is inserted in the inner spring space 161.

In FIG. 4, the valve body 110, the coil spring 160 and the damping body 200 is shown in an assembled condition. During assembly, the valve body 110, the coil spring 160 and the damping body 200 is inserted into an outer housing 180 of the air control valve 100 and pressed against a valve stop 152 (which is shown here as an excerpt) by the valve seat 120, wherein the valve seat 120 is connected to the valve passage element 105 (which is not shown here). In the assembled condition, the coil spring 160 as well as the damping body 200 is in a compressed state, in other words: a contracted state. In the compressed state, the coil spring 160 has a compressed spring length LSC, which is smaller than the uncompressed spring length LSU. The damping body 200 has a compressed damping body length LBC, which is smaller than the precompressed damping body length LBP.

In the compressed condition, the damping body 200 is held in an axial press fit 214 between the head side 112 of the valve body 110 and the valve stop 152 inside the inner spring space 161. The winding space 162 between a first coil winding 163 and a second coil winding 164 is smaller compared to the uncompressed condition shown in FIG. 2 or the precompressed condition shown in FIG. 3. However, the coil windings 163 and 164 are still able to move to a certain extent, allowing the coil spring 160 to be further compressed. Such further compression of the coil spring 160 occurs when the valve body 110 is pushed from the valve seat 120 by an opening force FO, wherein the opening force FO exceeds a closing force FC.

The damping beads 220, although compressed, still extend radially through one or more coil windings 163, 164 of the coil spring 160, inhibiting any direct contact between the coil windings 163, 164. This way, the generation of noise, in particular screeching noise caused by the direct contact of single coil windings 163, 164 excited by a passing air flow AF (not shown here) can be reduced or even completely inhibited.

Figure 5A:
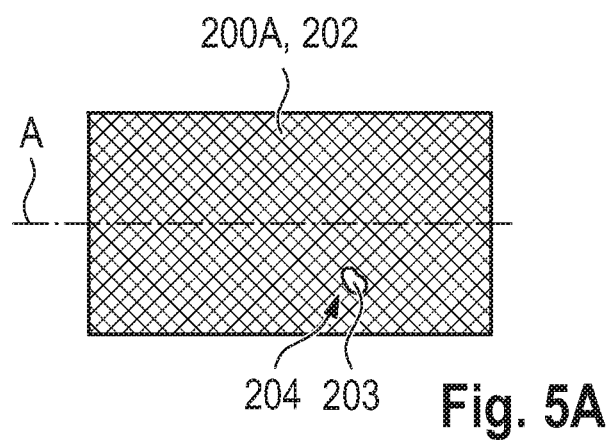
FIG. 5A shows a first variant of a damping body.

FIG. 5A shows an embodiment of a damping body 200A in form of a foam body 202. Particularly, the damping body 200A is comprised of polyurethane (PUR) foam, comprising a plurality 204 of evenly distributed foam cells of which one foam cell 203 is shown here as an excerpt, wherein one individual foam cell 203 can differ from another foam cell in form and size. It is important however, that the plurality 204 of foam cells 203, or at least a part of the plurality 204 of foam cells 203, are connected to each other in order to allow for an air permeability. Such air permeability is important to allow the air flow AF (not shown here) to pass the damping body 200A.

Figure 5B:
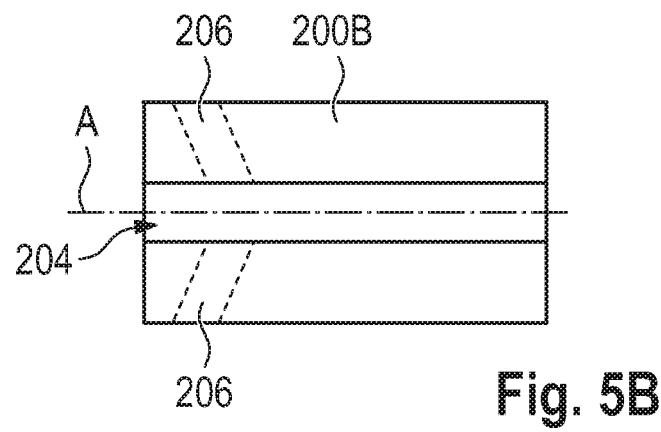
FIG. 5B shows a second variant of a damping body.

FIG. 5B shows a second embodiment of a damping body 200B. The damping body 200B can be comprised of a material similar to the first embodiment of a damping body 200A. However, damping body 200B comprises a through hole 204, enabling air permeability of the damping body 200B. With such through hole 204, or a plurality of through holes, air permeability can be enabled without having to rely on a foam cell structure, such as shown in FIG. 5A. However, it is also possible to combine both embodiments, by applying a foam body with one or more through holes 204 in order to further improve the air permeability. Also, it is possible to alternatively or additionally apply one or more radial through holes 206 in order to better accommodate the air flow entering the coil space flowing around the valve body.

Figure 6:
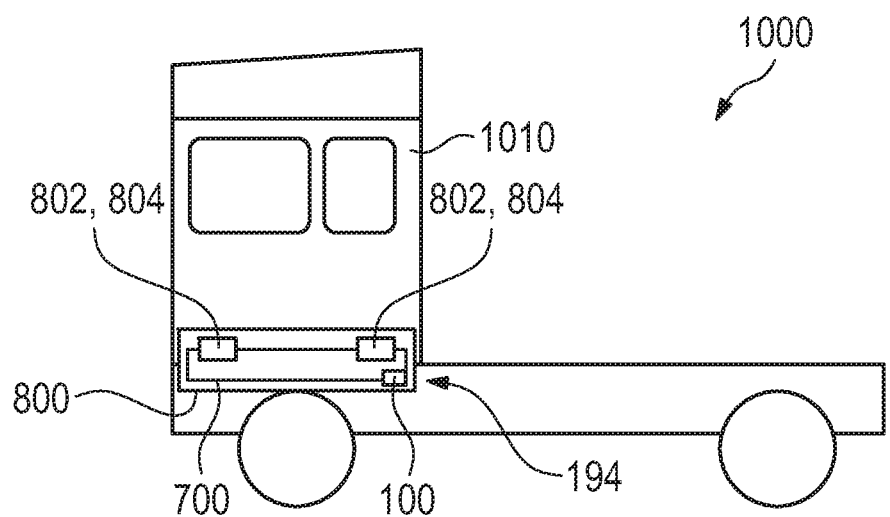
FIG. 6 shows a motor vehicle with a cabin and a vehicle cabin suspension system with an air control valve device comprising an air control valve as shown in FIG. 1.

FIG. 6 shows a motor vehicle 1000 with a cabin 1010, wherein the cabin 1010 is suspended by a cabin suspension system 800. The cabin suspension system 800 is adapted to level the cabin 1010 to a predefined height, in particular in an automated manner. In order to perform the levelling, the cabin suspension system 800 comprises an air control valve device 700 with at least one air cushioning receptacle 802, each in form of a bellows 804. The cabin suspension system 800 comprises four bellows 804, whereas two bellows 804 are shown in FIG. 6. The air control valve device 700 further comprises an air control valve 100 according to the concept of the present disclosure. An exhaust air flow FAE (not shown here) can be vented via a system exhaust line 194.

LIST OF REFERENCE SIGNS

100 Air control valve
105 Valve passage element
110 Valve body
112 Head side of the valve body
120 Valve seat
130 Throttling portion
132 Outer surface of the throttling portion
140 Passage inlet
141 Inlet side
150 Passage outlet
151 Outlet side
152 Valve stop
160 Coil spring
161 Inner spring space
162 Winding space between a first coil winding and a second coil winding
163 First coil winding
164 Second coil winding
165 Stop end of the coil spring
166 Body end of the coil spring
170 Lip seal
180 Outer housing
192 System connection socket
194 System exhaust line
200 Damping body
201 Open cell body
202 Foam body
203 Foam cell
204 Plurality of foam cells
205 Through hole
210 Press fit
212 Radial press fit
214 Axial press fit
220 Damping bead
700 Air control valve device
800 Cabin suspension system
802 Air cushioning receptacle
804 Bellows
1000 Motor vehicle
1010 Cabin of motor vehicle
A Valve axis
DBU Uncompressed damping body diameter
DSI Inner spring diameter
DSW Coil spring's winding material diameter
DTI Inner throttle diameter
DTO Outer throttle diameter
DVI Inner valve diameter
DVO Outer valve diameter
FA Air flow
FAE Exhaust air flow
FAS Supply air flow
FC Closing force
FO Opening force
LBC Compressed damping body length
LBP Precompressed damping body length
LBU Uncompressed damping body length
LS Spring length
LSU Uncompressed spring length
PE Exhaust pressure
PS Supply pressure While the above description constitutes the preferred embodiments of the present invention, it will be appreciated that the invention is susceptible to modification, variation and change without departing from the proper scope and fair meaning of the accompanying claims.

The invention claimed is:

1. An air control valve (100) adapted to control an air flow (FA) for an air cushioning receptacle (802) in a motor vehicle (1000), the air control valve (100) comprising:
   a valve seat (120),
   a valve body (110),
   a valve passage element (105) with a passage inlet (140) on an inlet side (141) and a passage outlet (150) on an outlet side (151),
   a coil spring (160) in contact with the valve body (110) and a valve stop (152) on the outlet side (151), adapted to exert a closing force (FC) to press the valve body (110) onto the valve seat (120), the coil spring having an uncompressed state with an inner spring diameter (DSI), and
   a damping body (200) arranged in an inner spring space (161) of the coil spring (160) such that the damping body (200) radially extends in a winding space (162) between a first coil winding (163) and a second coil winding (164) of the coil spring (160), wherein the damping body (200) has an outer diameter (DBU) in an uncompressed state that is greater than the inner spring diameter (DSI) and is fitted into the coil spring (160) with a press fit (210), wherein the damping body is disposed inside the coil spring, wherein the windings of the coil spring radially compress the damping body (200).

2. The air control valve (100) according to claim 1, wherein the damping body (200) radially extends in all winding spaces (162) between the coil windings of the coil spring (160).

3. The air control valve (100) according to claim 1, wherein the damping body (200) is adapted to prevent a contact between the first coil winding (163) and the second coil winding (164) when the coil spring (160) is compressed.

4. The air control valve (100) according to claim 1, wherein the damping body (200) is adapted to attenuate noise of a coil winding (162, 163) when the coil spring (160) is compressed.

5. The air control valve (100) according to claim 1, wherein the damping body (200) is separate from the valve body (110) and contacts a head side (112) of the valve body (110) and also contacts the valve stop (152).

6. The air control valve (100) according to claim 1, wherein the valve body (110) consists of an elastomer.

7. The air control valve (100) according to claim 1, wherein the damping body (200) is elastic.

8. The air control valve (100) according to claim 1, wherein the damping body (200) is air permeable.

9. The air control valve (100) according to claim 8, wherein the damping body (200) is at least one of an open cell body (201), a foam body (202), or a polyurethane body (203).

10. The air control valve (100) according to claim 1, wherein the air control valve (100) comprises an outer housing (180).

11. The air control valve (100) according to claim 1, wherein the valve passage element (105) has a throttling portion (130) arranged, with respect to the air flow (FA), upstream of the valve seat (120) and the throttling portion (130) has an inner throttle diameter (DTI) smaller than an inner valve diameter (DVI) and the throttling portion (130) has an outer throttle diameter (DTO) smaller than an outer valve diameter (DVO).

12. The air control valve (100) according to claim 11, further comprising a lip seal (170) arranged on an outer surface (132) of the throttling portion (130).

13. An air control valve device (700) comprising the air control valve (100) according to claim 1, wherein the air cushioning receptacle is part of an air spring device or air leveling device for a cabin suspension system (800) of the motor vehicle (1000).

14. A vehicle cabin suspension system (800) comprising the air control valve (100) according to claim 1.

15. The motor vehicle (1000) with a cabin (1010) and the cabin suspension system (800) according to claim 14.

\* \* \* \* \*